United States Patent Office 3,404,537
Patented Oct. 8, 1968

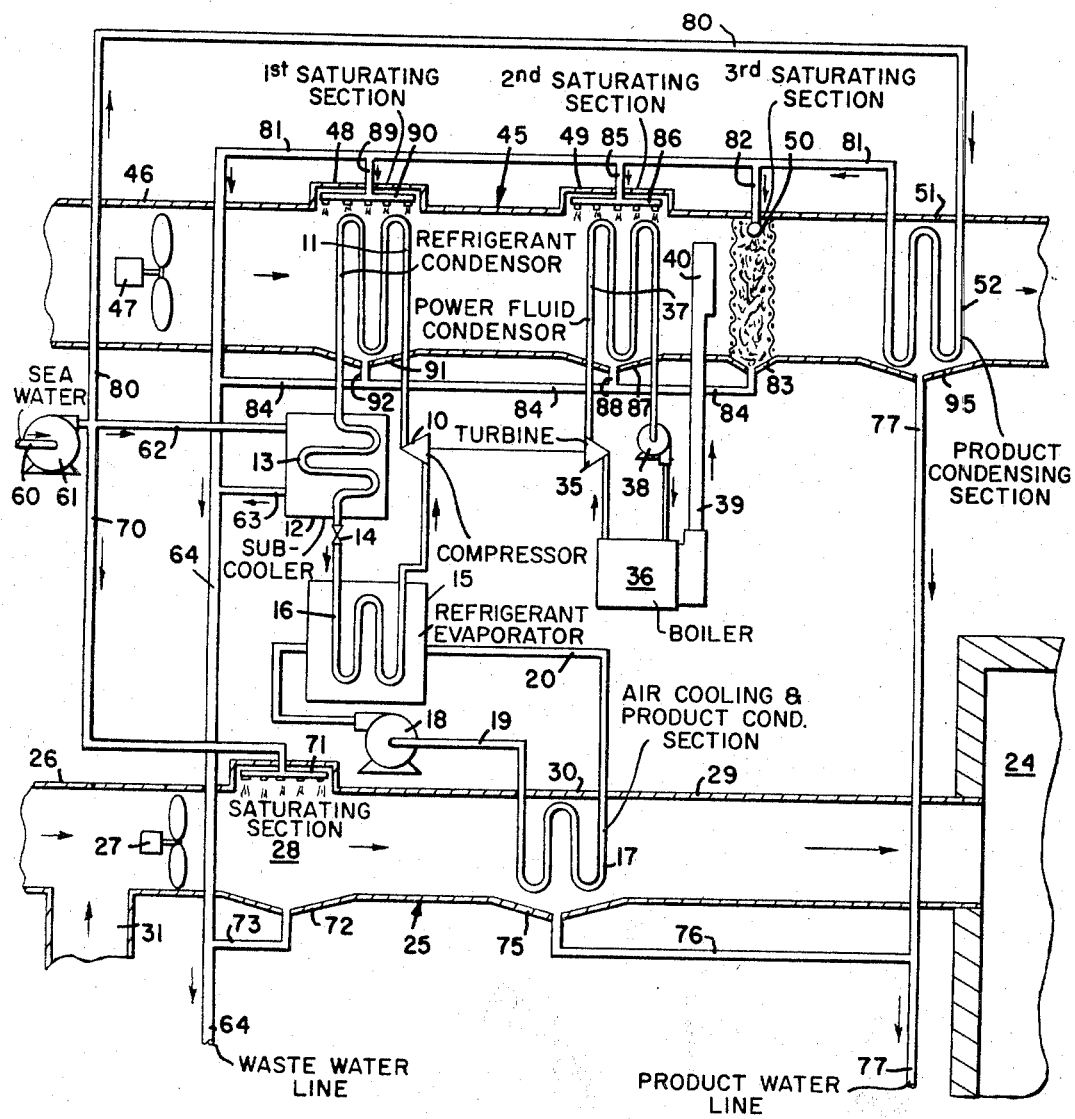

3,404,537
COMBINED REFRIGERATION AND SALINE
WATER CONVERSION SYSTEM
Louis H. Leonard, Jr., De Witt, N.Y., assignor to Carrier
Corporation, Syracuse, N.Y., a corporation of Delaware
Filed Oct. 24, 1965, Ser. No. 504,551
7 Claims. (Cl. 62—123)

ABSTRACT OF THE DISCLOSURE

A combined air conditioning and saline water conversion system having a compressor driven by a steam turbine. A refrigerant condenser and a steam turbine condenser are shown of the evaporative type utilizing sea water for cooling. The flue gas from the boiler is discharged into an air stream passing over the refrigerant and steam turbine condensers. The air and flue gas are then saturated in an additional saturating section and passed to a product water condenser where water vapor is condensed from the saturated and heated air into which the heat of the cycle has been discharged to evaporate water from the saline water. The air conditioning system also includes a presaturating section ahead of the refrigerant evaporator which serves to condense additional product water.

---

This invention relates to a system which is capable of providing refrigeration and simultaneously converting saline water to fresh water.

Full utilization of some of the world's land areas has been hindered by a lack of fresh water for human consumption and crop irrigation. In some of these regions, plentiful quantities of brackish water from wells, contaminated water, or sea water from the ocean is available and much attention has been given to providing the needed fresh water from these salt-laden sources. In other regions, the increase in population or decrease in rainfall has created serious water shortages and attempts have been made to find new water sources to satisfy the need.

The demand for fresh water has given rise to many proposals for separating fresh water from the available aqueous salt-laden solutions such as sea water, but in many instances, these proposals have failed because of either the excess cost of constructing a plant with specialized equipment designed for saline water conversion or because the operating cost of the plant was so high that the resulting cost of the fresh water made it economically unattractive for general use.

In many of the regions where there is a great need for fresh water the use of air conditioning in homes, offices, and public buildings is either common or necessary for human comfort. It is therefore an object of this invention to provide a means and method for producing fresh water from an air conditioning or refrigeration system.

It is a further object of this invention to provide a method of operating an air conditioning or refrigeration system in a manner so as to provide fresh water by utilizing the heat rejected from the system.

It is still a further object of this invention to provide a combined air conditioning and saline water conversion system which utilizes relatively standard air conditioning components to provide a source of fresh water.

In accordance with a preferred embodiment of this invention, there is provided a refrigeration circuit having a refrigerant evaporator, a refrigerant condenser, and a refrigerant compressor driven by a prime mover connected to provide air conditioning to a desired region. Heat rejected from the refrigerant condenser and from the prime mover is utilized to saturate a body of air with water vapor by contacting the body of air into which heat is rejected from the prime mover with an aqueous solution thereby evaporating water into the body of air. A cooling medium is then passed in heat exchange relation with the saturated air to condense fresh product water from it.

In the illustrated embodiment of this invention, the prime mover comprises a turbine and is driven by a power fluid which is vaporized in a boiler. The boiler is heated by a combustible fuel such as natural gas which provides a hot gaseous exhaust containing water vapor. The hot exhaust gas is discharged into a body of air which is then saturated by contacting it with the aqueous solution. The water vapor in the gaseous exhaust as well as the water evaporated from the aqueous solution, due to the heat imparted to the body of air from the exhaust gas, is also condensed to provide additional fresh product water.

Furthermore, air being conditioned by the refrigeration system may be saturated with water vapor by contacting it with aqueous solution and still further product water can be condensed from the air by the evaporator of the refrigeration circuit.

These and other objects of this invention will become more readily apparent by reference to the following specification and attached drawing where the figure is a schematic diagram, partially in cross-section, showing a refrigeration system adapted to provide both air conditioning and fresh water in accordance with this invention.

Referring to the drawing, there is shown an apparatus having a refrigerant circuit comprising a compressor 10, a refrigerant condenser 11, a subcooler 12 having a heat exchanger 13 therein, an expansion valve 14, and a heat exchanger 15 having an evaporator heat exchanger passage 16 therein connected in a circuit to provide refrigeration. A secondary chilled water circuit is provided comprising heat exchanger 15, chilled water coil 17, and pump 18. The water chilled by evaporator 16 passes through chilled water line 20 to chilled water coil 17 to cool air being conditioned. The chilled water is returned to heat exchanger 15 through line 19 by pump 18 for rechilling by refrigerant evaporator 16.

An air handling system, designated generally 25, is provided for passing air to a room or other location 24 being conditioned. Air handling system 25 comprises an outside air duct 26 and a fan 27 for passing air through a saturating section 28 into heat exchange relation with chilled water coil 17 in condensing section 30. The conditioned air is passed from chilled water coil 17 through duct 29 to room 24 being conditioned. A suitable return air duct 31 may be provided to recirculate room air back through saturating section 28 and chilled water coil 17. Air passing across the surface of chilled water coil 17 is in heat exchange relation with evaporating refrigerant in refrigerant evaporator 16 due to the circulation of chilled water through lines 19 and 20. While a secondary chilled water circuit has been shown in the preferred embodiment illustrated, it will be appreciated that it can be omitted by locating evaporator 16 directly in duct 29.

Compressor 10 is preferably of the centrifugal type and is connected to be driven either directly or indirectly by a prime mover such as turbine 35. A power fluid circuit comprising a boiler 36 for vaporizing power fluid turbine 35, a power fluid condenser 37, and a condensate return pump 38 are provided to supply vaporized power fluid to drive turbine 35 and compressor 10.

A suitable power fluid for use in the system described is water and a suitable refrigerant is trichloromonofluoromethane, commonly known as R11. As illustrated in the drawing, boiler 36 may be of the type adapted to burn a combustible fuel, such as natural gas, to supply heat to vaporize power fluid in the boiler. It has been found that when a pound of natural gas is burned, its combustion produces approximately 2.26 pounds of water vapor as a part of the hot gaseous exhaust of the combustion process. These combustion gases may be passed from boiler 36 through flue gas outlet 40 into a body of air in a heat rejection system 45.

Heat rejection system 45 comprises a duct 46, a fan 47, a saturating section 48, a second saturating section 49, a third saturating section 50, and a product water condensing section 51 having a heat exchanger 52 therein.

Sea water or other brackish or contaminated aqueous solution is introduced into the system from line 60 through pump 61. A portion of the sea water passes through line 62 through refrigerant subcooler 12 where the sea water passes in heat exchange relation with liquid refrigerant from refrigerant condenser 11 in heat exchanger 13 to extract additional heat from it, thereby subcooling the refrigerant. Sea water from subcooler 12 passes through line 63 into brine discharge line 64 where it is discharged from the system. Subcooling of the liquid refrigerant is advantageous because it results in more heat being transferred from the evaporator to the condenser for each pound of refrigerant circulated through the system by the compressor.

Another portion of sea water passes from pump 61 through line 70 to a spray header 71 in saturating section 28 of air handling system 25. Spray system 71 sprays sea water into the body of air passing through the air handling system whereby water is evaporated into the body of air to increase its saturation. The remaining brine is collected in brine sump 72 from which it passes through line 73 into brine discharge line 64. Suitable packing means may be disposed in saturating section 28 to further increase the area of surface contact between air and sea water in the saturating section.

Normally, air leaving saturating section 28 is close to being saturated, but as referred to herein the air will be said to be saturated in the sense that its degree of saturation with water vapor has been increased.

The saturated air being conditioned passes from saturating section 28 into condensing section 30 of air handling system 25. In condensing section 30, the air is placed in heat exchange relation with refrigerant evaporating in evaporator 16. Heat is removed from the air by heat exchanger 17, whereby fresh product water is condensed from the air. The condensed product water is collected in sump 75 from which it passes through line 76 into product water line 77 for storage, distribution, and consumption at a suitable location. The cooled air then passes from condensing section 30 through duct 29 to room or other space 24 being air conditioned. The refrigeration load on the refrigeration cycle is not necessarily increased, even though fresh water is being produced in addition to the normal air conditioning demand on the system because the saturation process is adiabatic.

Another portion of the incoming sea water passes from pump 61 through line 80 and heat exchanger 52 in condensing section 51. The sea water absorbs heat in passing through heat exchanger 52 from which the warmed sea water is then passed into line 81. From line 81, part of the sea water passes into brine discharge line 64.

A portion of the warmed sea water from line 81 passes through line 82 into saturating section 50. The sea water in saturating section 50 is sprayed or otherwise placed in contact with the body of air in heat rejection system 45 where water is evaporated from the sea water into the air due to heat rejected from boiler 36 in the flue gas exhaust. The resulting brine is collected in brine sump 83 and passed through line 84 into brine discharge line 64.

Another portion of the warm sea water passes from line 81 through line 85 into spray system 86 in saturating section 49. The brine is discharged by spray system 86 over the exterior surfaces of power fluid condenser 37 thereby evaporating water from the sea water, due to heat rejected from turbine 35, while assisting in cooling and condensing of the power fluid in the condenser. The resulting brine is collected in sump 87 and lines 88 and 84 into brine discharge line 64.

Still another portion of the warm sea water passes from line 81 through line 89 into spray system 90 and saturating section 48. The sea water is sprayed by spray system 90 over the exterior surfaces of refrigerant condenser 11. The sea water absorbs heat rejected from the condensing refrigerant thereby evaporating water vapor into the body of air in heat rejection system 45 and assisting in the condensing of refrigerant in the condenser. The resulting brine is collected in sump 91 and passed through lines 92 and 84 into brine discharge line 64.

While condensers 11 and 37 have been described as being evaporative condensers, it will be understood that they can be dry surface condensers if desired. In that event, spray systems 90 and 86 can be omitted and the function performed by saturating section 50 or any suitable type of condenser may be employed which rejects heat in a manner to directly or indirectly vaporize water from an aqueous solution. Also separate air streams may be passed over condensers 11 and 37 and they may be either joined or separately condensed by splitting the function of condenser 52 into a plurality of portions. However, the arrangement shown and described herein is preferred for simplicity and because it tends to minimize cost.

Air is introduced into heat rejection system 45 and passed through duct 46 by fan 47. The air passes into saturating section 48 where heat is rejected into it from refrigerant condenser 11. The air into which heat is rejected from condenser 11 is contacted by sea water sprayed through spray system 90. Consequently, water is evaporated from the sea water into the air in saturating section 48 and the water vapor content of the air is increased. As uses herein, the term "air" may include any suitable gas for heat rejection.

The saturated air from saturating section 48 may also pass through saturating section 49. Heat is rejected from condenser 37 in saturating section 49 into the body of air therein and this heat causes additional water to be evaporated into the body of air thereby further increasing its saturation.

The saturated air leaving saturating section 49 may then be mixed with the relatively hot flue gas discharged from flue outlet 40. The flue gas as previously explained contains some water vapor as a product of the combustion which takes place in boiler 36. In addition, the hot flue gas further heats the body of air discharged from saturating section 49. The heated body of air then passes through saturating section 50 where it is again placed in contact with sea water to further increase its saturation.

The saturated air leaving saturating section 50 passes into condensing section 51 of heat rejection system 45 where fresh product water is condensed therefrom by heat exchange with the relatively cooled sea water passing through heat exchanger 52. The product water is collected in sump 95 and pased through line 77 to a suitable location for consumption. The air may then be discharged from heat rejection system 45 to the atmosphere or other suitable location, as desired.

In the system shown, flue gas is discharged directly into the body of air in heat rejection system 45, in order to recover the water vajor therein and to reject the heat of the flue gas to the air for evaporation of water. It will be appreciated that the flue gas may pass through a suitable gas to air heat exchanger for indirectly heating the body of air in heat rejection system 45, instead of being directly discharged into the body of air. In that event, a separate condenser can be employed to extract the water vapor from the flue gas if desired. Furthermore, while the heat rejection system has been shown as comprising means for passing a single body of air through all the sections thereof, it will be understood that any one or all of these sections may be separated from each other or arranged in different sequence within the scope of this invention.

It will be seen that by the practice of this invention, the energy rejected from the air conditioning system, which is normally wasted, is used to evaporate water from sea water or any other desired aqueous solution in order to provide a quantity of fresh product water. Consequently, the operating cost of the air conditioning system is not greatly increased by the practice of this invention while at the same time a substantial quantity of fresh water can be produced. It is estimated that a 40-ton capacity, steam turbocompressor driven refrigeration system, is capable of producing over 5,000 gallons per day of fresh water from sea water.

While the system illustrated herein employs a turbine driven refrigeration system, it will be appreciated that other power sources such as an internal combustion engine, a steam engine, or a gas turbine can be employed within the scope of this invention by rejecting heat from the prime mover into air which is then saturated with water vapor, from which the water vapor is condensed to provide fresh product water.

While a preferred embodiment of this invention has been described for purposes of illustration thereof, it will be understood that the invention may be otherwise embodied within the scope of the following claims.

I claim:

1. An apparatus for providing refrigeration to a region to be cooled and for obtaining fresh water from an aqueous solution comprising:
   (A) a refrigeration circuit including a refrigerant evaporator disposed in heat exchange relation with the region to be cooled, a refrigerant condenser, and a refrigerant compresser connected to provide refrigeration at a desired remote region by evaporation of refrigerant in heat exchange relation with said desired remote region being cooled;
   (B) a heat operated prime mover connected to supply power to operate said refrigerant compressor;
   (C) said refrigerator condenser being disposed in heat exchange relation with said body of air for rejecting heat from said refrigeration system including heat from the remote region being cooled, into said body of air;
   (D) prime mover heat rejection means comprising a prime mover heat exchanger connected to said heat operated prime mover to receive waste heat therefrom, said prime mover heat exchanger being disposed in heat exchange relation with a body of air for rejecting waste heat from said prime mover into said body of air;
   (E) saturating means for increasing the water vapor content of the bodies of air into which heat is rejected from said refrigerant condenser and said prime mover heat rejection means, said saturating means including means to contact said bodies of air with an aqueous solution to evaporate water therefrom into said bodies of air; and
   (F) product water condensing means comprising a heat exchanger disposed in heat exchange relation with said bodies of air after exposure to said saturating means, said product water condensing means comprising heat exchange means for passing a cooling medium in heat exchange relation with said bodies of air after contact thereof with said aqueous solution for cooling said bodies of air and condensing water vapor therefrom to thereby form product water, and product water collecting means for collecting water condensed from said bodies of air by heat exchange relation with said cooling medium.

2. An apparatus as defined in claim 1 including air duct passage means for passing a body of air serially in heat exchange relation with said refrigerant condenser, from said refrigerant condenser to said prime mover heat exchanger in heat exchange relation therewith, from said prime mover heat exchanger to said saturating means for contact with said aqueous solution, and from said saturating means to said product water condensing means for condensation of water vapor therefrom.

3. An apparatus as defined in claim 1 wherein said saturating means comprises means to distribute said aqueous solution over an exterior surface of said refrigerant condenser and said prime mover heat exchnger for evaporation of water from said aqueous solution.

4. An apparatus for providing refrigeration to a desired region to be cooled and for providing fresh water from an aqueous solution which comprises:
   (A) a refrigeration system including a refrigerant compressor, a refrigerant condenser and a refrigerant evaporator connected in a refrigeration circuit to provide refrigeration to a desired remote region to be cooled by evaporation of refrigerant in heat exchange with the desired remote region to be cooled;
   (B) a heat operated prime mover connected to said refrigerant compressor for driving said refrigerant compressor, said prime mover including prime move heat exchanger connected thereto for receiving waste heat from said prime mover and discharging the waste heat therefrom;
   (C) said refrigerant condenser comprising an evaporative heat exchanger disposed in a body of air for rejecting heat from the remote region being cooled into said body of air, said refrigerant condenser including a refrigerant condenser passage through which refrigerant from said refrigeration circuit passes and a solution distributor means connected to a source of aqueous solution and disposed adjacent said refrigerant condenser passage for discharging said aqueous solution over the exterior surface thereof for cooling and condensing refrigerant passing therethrough and for evaporating water from said aqueous solution into said body of air and increasing the water vapor saturation of said body of air;
   (D) said prime mover heat exchanger comprising an evaporative heat exchanger disposed in a body of air, said prime mover heat exchanger including a heat exchange fluid passage and a solution distributor means connected to a source of aqueous solution and disposed adjacent said heat exchange fluid passage for discharging aqueous solution over the exterior surface of said heat exchange fluid passage for evaporating water from said aqueous solution into said body of air and increasing the water vapor saturation thereof;
   (E) product water condensing means including a product water heat exchanger connected to a source of cooling medium for condensing water vapor from the bodies of air saturated by said prime mover heat exchanger and by said refrigerant condenser by heat exchange between said bodies of air and said cooling medium, said product water condensing means including product water collecting means for collecting product water condensed from said bodies of air; and
   (F) air distribution means for passing the bodies of air saturated by said prime mover heat exchanger and said refrigerant condenser to said product water condensing means.

5. An apparatus as defined in claim 4 including conduit means for supplying aqueous solution to the heat exchanger in said product water condensing means as a cooling medium for heat exchange with air containing water vapor therein, thereby heating said aqueous solution; and conduit means for passing heated aqueous solution from said heat exchanger in the product water condensing means to at least one of said evaporative heat exchangers for distribution over said evaporative heat exchanger, thereby facilitating evaporation of water vapor from the heated aqueous solution due to heat acquired in said product water condensing means.

6. An apparatus as defined in claim 4 wherein
(A) said apparatus includes a prime mover heat source connected to said prime mover for driving said prime mover, said prime mover heat source having a hot gaseous exhaust;
(B) heat exchange means for passing the hot gaseous exhaust of said prime mover heat source in heat exchange relation with a body of air to supply heat thereto;
(C) additional saturating means for passing the body of air heated by the hot gaseous exhaust of said prime mover heat source into contact with an aqueous solution for evaporating water vapor from said aqueous solution and increasing the water vapor saturation of said body of air; and
(D) said air handling means including means for passing the body of air saturated by said additional saturating means to said product water condensing means for condensing water vapor therefrom.

7. An apparatus as defined in claim 4 wherein
(A) said refrigerant evaporator is disposed in a second air handling system for providing air conditioning to the desired location;
(B) said primer mover comprises a turbine;
(C) said apparatus includes a boiler connected for supplying steam to drive said turbine, said boiler including a fuel burning heat source which provides a hot gaseous exhaust;
(D) heat exchange means for passing the hot gaseous exhaust of said fuel burning heat source into the body of air passing to the product water condensing means for heating said body of air by admixture therewith; and
(E) saturating means for further saturating the body of air subsequent to mixture thereof with said hot gaseous exhaust and prior to passage thereof to said product water condensing means, said saturating means including means for providing direct contact between said body of air including said hot gaseous exhaust with an aqueous solution to evaporate water therefrom.

References Cited
UNITED STATES PATENTS

| | | | |
|---|---|---|---|
| 1,232,269 | 7/1917 | Forbes | 203—11 |
| 1,379,502 | 5/1921 | De Woern | 203—49 |
| 1,466,670 | 9/1923 | Monti | 203—100 |
| 2,479,766 | 8/1949 | Mulvany | 203—10 |
| 2,589,406 | 3/1952 | Latham | 203—24 |
| 2,902,414 | 9/1959 | Schmerzler | 203—49 |
| 3,203,875 | 8/1965 | Sturtevant | 203—11 |
| 3,234,109 | 2/1966 | Lustenader | 203—11 |
| 3,243,359 | 3/1966 | Schmidt | 203—26 |
| 3,248,305 | 4/1966 | Williamson | 203—26 |
| 3,334,026 | 8/1967 | Dobell | 203—10 |

FOREIGN PATENTS

| | | |
|---|---|---|
| 24,930 | 12/1956 | Germany. |

WILBUR L. BASCOMB, JR., *Primary Examiner.*